(12) United States Patent
Tada et al.

(10) Patent No.: US 6,288,463 B1
(45) Date of Patent: *Sep. 11, 2001

(54) GENERATOR

(75) Inventors: Masahiro Tada, Kanagawa-Ken; Hirokazu Ikegami, Tokyo, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,098
(22) PCT Filed: Oct. 14, 1997
(86) PCT No.: PCT/JP97/03678
  § 371 Date: Jan. 19, 1999
  § 102(e) Date: Jan. 19, 1999
(87) PCT Pub. No.: WO98/16989
  PCT Pub. Date: Apr. 23, 1998

(30) Foreign Application Priority Data

Oct. 15, 1996 (JP) .................................................. 8-271952

(51) Int. Cl.[7] .............. H02K 7/10; H02K 7/06; H02K 23/60
(52) U.S. Cl. ................... 310/75 B; 310/83; 310/118
(58) Field of Search ............... 310/99, 159, 161, 310/69, 75 C, 75 B, 102 R, 113, 155, 96, 83, 80, 75 R, 66, 154, 152, 118

(56) References Cited

U.S. PATENT DOCUMENTS 2,459,829 * 1/1949 Maxwell ............................. 310/99

* cited by examiner

Primary Examiner—Elvin Enad
Assistant Examiner—Guillermo Perez
(74) Attorney, Agent, or Firm—Jay H. Maioli (57) ABSTRACT

A generating apparatus includes an AC generator (11) having a stator (38) arranged around a rotary shaft (32) and a rotor (35) secured to the rotary shaft (32) and provided with an annular portion surrounding the outer peripheral portion of the stator (38) and a manual rotary driver mechanism including an accelerator (13) and engaging with a gear (33) mounted on the rotary shaft (32) and a rotary driver (12) engaging with the accelerator (13) and operative to drive the rotor (35) of the AC generator (11) to rotate through the accelerator (13) and the gear (33) so as to cause the AC generator (11) to generate electric power when the rotary driver (12) is rotated, wherein the diameter of the gear (33) mounted on the rotary shaft (32) of the AC generator (11) is set to be larger than the diameter of the rotary shaft (32) and smaller than the diameter of the annular portion of the rotor (35).

4 Claims, 5 Drawing Sheets

GENERATOR

TECHNICAL FIELD

The present invention relates to a generating apparatus which comprises an alternating-current (AC) generator having a stator arranged around a rotary shaft and a rotor secured to the rotary shaft and having an annular portion surrounding the outer peripheral portion of the stator and a manual rotary driving mechanism which is operative to drive the rotor to rotate so that the AC generator is put in an operating condition for generating electric power.

TECHNICAL BACKGROUND

There has been proposed an electronic equipment, such as a portable radio receiver or the like, which is provided with a manual rotary driver and a generator having a rotor and operative to generate electric power when the rotor is driven to rotate by the manual rotary driver. When such an electronic equipment is put into actual use, for example, the manual rotary driver is rotated manually by a user to drive the rotor of the generator to rotate, so that the generator is put in operation for generating electric power. The electric power obtained from the generator is supplied to a secondary battery or a condenser for accumulating electric power, such as an electrical double layer condenser, connected with the generator as a load and stored or accumulated in the secondary battery or the condenser for accumulating electric power. The electronic equipment, such as the portable radio receiver or the like, is operative to work with a power source of the secondary battery or the condenser for accumulating electric power in which the electric power from the generator is stored or accumulated.

Since such an electronic equipment containing the generator as mentioned above generates electric power for itself as occasion demands, it can be put in operation without any external power source and being concerned about consumption in a battery contained therein. Accordingly, it is spontaneously considered that the electronic equipment containing the generator is used for countermeasures against various calamities. For example, under a situation where a commercial electric power supplying system is visited by a calamity, such as a big earthquake, a big fire and so on so as, to be destroyed and an inconvenience in which it is very difficult to obtain new batteries is raised by the calamity, the electronic equipment containing the generator can be operative to function normally.

Then, it is required for the electronic equipment containing the generator to be made portable and easily carried and used with simple operations by a user when a calamity occurs. Consequently, it is desirable that each of a generating apparatus comprising the generator contained in the electronic equipment and the manual rotary driver for driving the rotor of the generator to rotate and a power supplying portion for supplying a load connected to the generator with electric power is miniaturized in weight and size so that high efficiency is obtained.

As for the generating apparatus provided to the electronic equipment containing the generator, it has been proposed that such an apparatus as to comprise an AC generator having a stator arranged around a rotary shaft and a rotor secured to the rotary shaft and having an annular portion surrounding the outer peripheral portion of the stator and a manual rotary driving mechanism having a rotary driver which can be manually rotated and an accelerator for increasing the rotation of the rotary driver to be transmitted to the rotor of the AC generator.

In the generating apparatus thus provided, when the rotary driver of the manual rotary driving mechanism is rotated manually, the rotation of the rotary driver is increased by the accelerator and the increased rotation is transmitted from the accelerator to the rotor of the AC generator so as to cause the AC generator to generate electric power. The electric power obtained from the AC generator is rectified to be converted to direct-current (DC) electric power which is supplied to a secondary battery or a condenser for accumulating electric power to be stored therein.

In the generating apparatus which comprises the AC generator and the manual rotary driving mechanism having the rotary driver and the accelerator as mentioned above, when the operation for generating electric power is carried out, a torque necessary for rotating the rotary driver of the manual rotary driving mechanism is relatively large and therefore there has been a problem that a user who rotates manually the rotor of the AC generator through the rotary driver and the accelerator of the manual rotary driving mechanism, meets with such resistance as to be generally expressed "heavy" and is required to spend a relatively great deal of labor and further it is feared that it is substantially impossible for the user to rotate appropriately the rotary driver of the manual rotary driving mechanism.

The torque necessary for rotating the rotary driver of the manual rotary driving mechanism so as to rotate the rotor of the AC generator is increased to be relatively large in the following manner, for example.

When the rotation transmitted from the rotary driver of the manual rotary driving mechanism through the accelerator to the rotor of the AC generator is steeply increased by the accelerator for the purpose of rotating the rotor of the AC generator at a relatively high speed, the torque necessary for rotating the rotary driver of the manual rotary driving mechanism so as to rotate the rotor of the AC generator through the accelerator is increased, and especially, an initial torque necessary for the incipient stage of the rotation of the rotor of the AC generator is steeply increased. In addition, when the electric power obtained from the AC generator is rectified to be converted to DC electric power which is supplied to the secondary battery or the condenser for accumulating electric power to be stored therein, a torque necessary for rotating the rotor of the AC generator becomes relatively large in response to an output current of the AC generator which increases by reason of the following.

Generally, in a generator having a stator and a rotor, for example, a coil wound on a magnetic core is provided on the stator and a permanent magnet opposite to the magnetic core on which the coil is wound is provided on the rotor. When the permanent magnet provided on the rotor is moved to the magnetic core on which the coil is wound, electromotive force is generated in the coil and a current based on the electromotive force flows through the coil to form an output current of the generator on condition that a load is connected with the generator. When the current flows through the coil, the magnetic core on which the coil is wound is magnetized by that current, so that magnetic attractive force and magnetic repulsive force are generated between the magnetic core and the permanent magnet provided on the rotor and electromagnetic brake acts on the rotor. Accordingly, a torque overcoming the electro-magnetic brake acting on the rotor is necessitated to rotate the rotor. The larger the current flowing through the coil wound on the magnetic core, namely, the output current of the generator is, the larger the electromagnetic brake acting on the rotor becomes. Consequently, the larger the output current of the generator is, the larger the torque necessary for rotating the rotor becomes.

Accordingly, it is an object of the present invention to provide a generating apparatus comprising an AC generator and a manual rotary driving mechanism having a rotary driver and an accelerator, in which the rotation of the rotary driver is increased by the accelerator and the increased rotation is transmitted from the accelerator to a rotor of the AC generator so as to cause the AC generator to generate electric power when the rotary driver is rotated, and by which force required to act necessarily on the rotary driver to rotate the same is effectively reduced and therefore the rotary driver can be easily and appropriately rotated by relatively small force.

DISCLOSURE OF THE INVENTION

According to the present invention, there is provided a generating apparatus comprising an AC generator which has a stator arranged around a rotary shaft and a rotor secured to the rotary shaft and having an annular portion surrounding the outer peripheral portion of the stator and a manual rotary driver mechanism which includes an accelerator engaging with a gear mounted on the rotary shaft of the AC generator and a rotary driver engaging with the accelerator and is operative to drive the rotor of the AC generator to rotate through the accelerator and the gear mounted on the rotary shaft of the AC generator so as to cause the AC generator to generate electric power when the rotary driver is rotated, wherein the diameter of the gear mounted on the rotary shaft of the AC generator is set to be larger than the diameter of the rotary shaft and smaller than the diameter of the annular portion of the rotor.

In the generating apparatus thus constituted in accordance with the present invention, when the rotary driver of the manual rotary driver mechanism is rotated, the rotation of the rotary driver is increased by the accelerator and the increased rotation is transmitted to the gear mounted on the rotary shaft of the AC generator, and thereby, the rotor secured on the rotary shaft of the AC generator is driven to rotate. Under such a situation, since the diameter of the gear mounted on the rotary shaft of the AC generator is set to be larger than the diameter of the rotary shaft, force required to act necessarily on the gear mounted of the rotary shaft of the AC generator for causing the rotor mounted of the rotary shaft of the AC generator to rotate is reduced and thereby a torque required to be transmitted to the gear mounted of the rotary shaft of the AC generator is reduced.

Further, since the diameter of the gear mounted on the rotary shaft of the AC generator is set to be smaller than the diameter of the annular portion of the rotor of the AC generator, the peripheral speed of the annular portion of the rotor of the AC generator is more accelerated compared with the peripheral speed of the gear mounted on the rotary shaft of the AC generator and thereby a rotation increasing factor necessitated in the accelerator of the manual rotary driver mechanism for obtaining a predetermined peripheral speed of the annular portion of the rotor of the AC generator is reduced.

With the reduction in the force required to act necessarily on the gear mounted of the rotary shaft of the AC generator so as to cause the rotor mounted of the rotary shaft of the AC generator to rotate, which results from such an arrangement that the diameter of the gear mounted on the rotary shaft of the AC generator is set to be larger than the diameter of the rotary shaft, and the reduction in the rotation increasing factor necessitated in the accelerator of the manual rotary driver mechanism for obtaining the predetermined peripheral speed of the annular portion of the rotor of the AC generator, which results from such an arrangement that the diameter of the gear mounted on the rotary shaft of the AC generator is set to be smaller than the diameter of the annular portion of the rotor of the AC generator, force required to act necessarily on the rotary driver for rotating the same is effectively reduced and therefore the rotary driver can be easily and appropriately rotated by relatively small force.

EMBODIMENT MOST PREFERABLE FOR WORKING OF THE INVENTION

Figure 1:
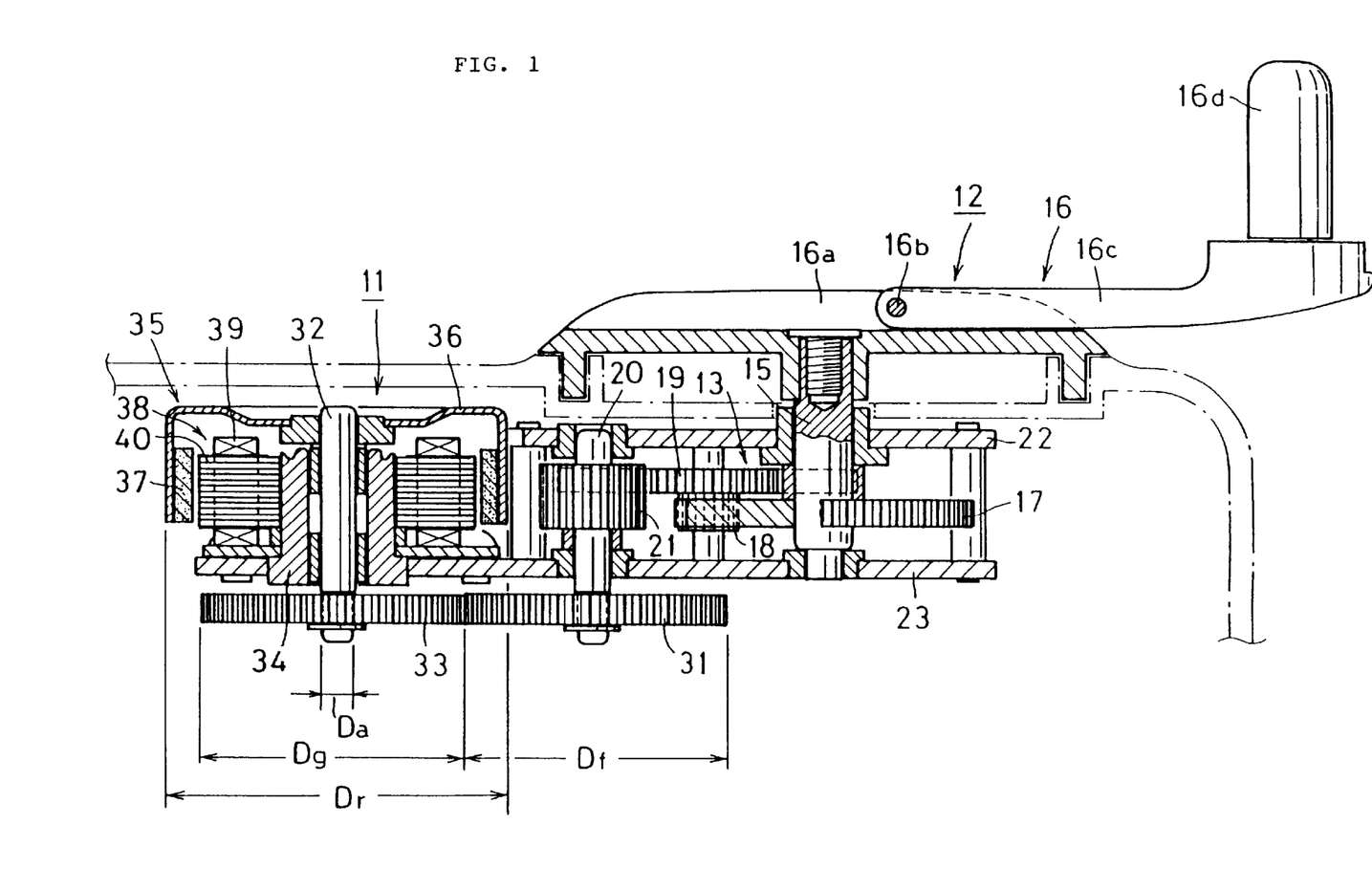
FIG. 1 is a schematic cross-sectional view showing an embodiment of generating apparatus according to the present invention.
Figure 2:
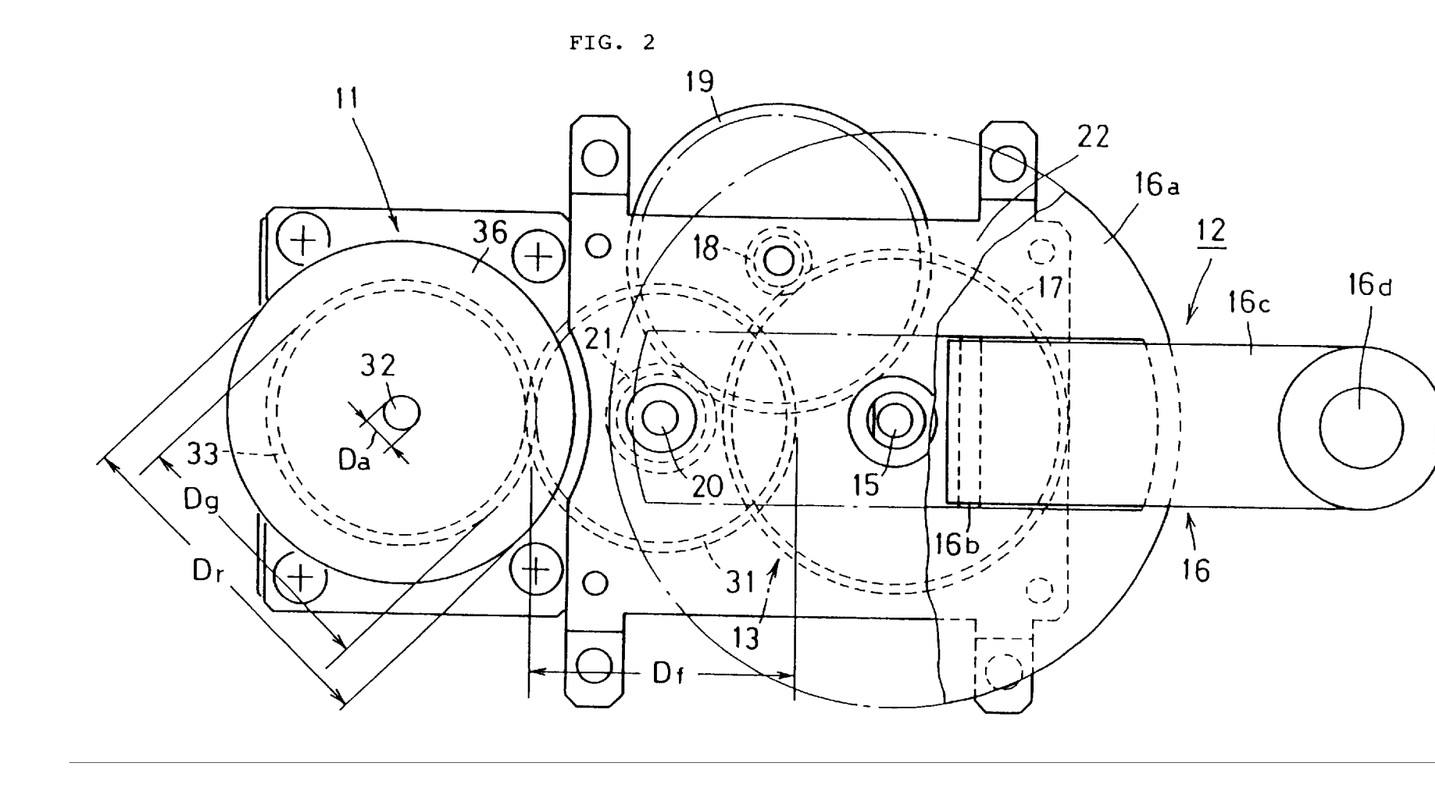
FIG. 2 is a schematic plane view showing an embodiment of generating apparatus according to the present invention.
Figure 3:
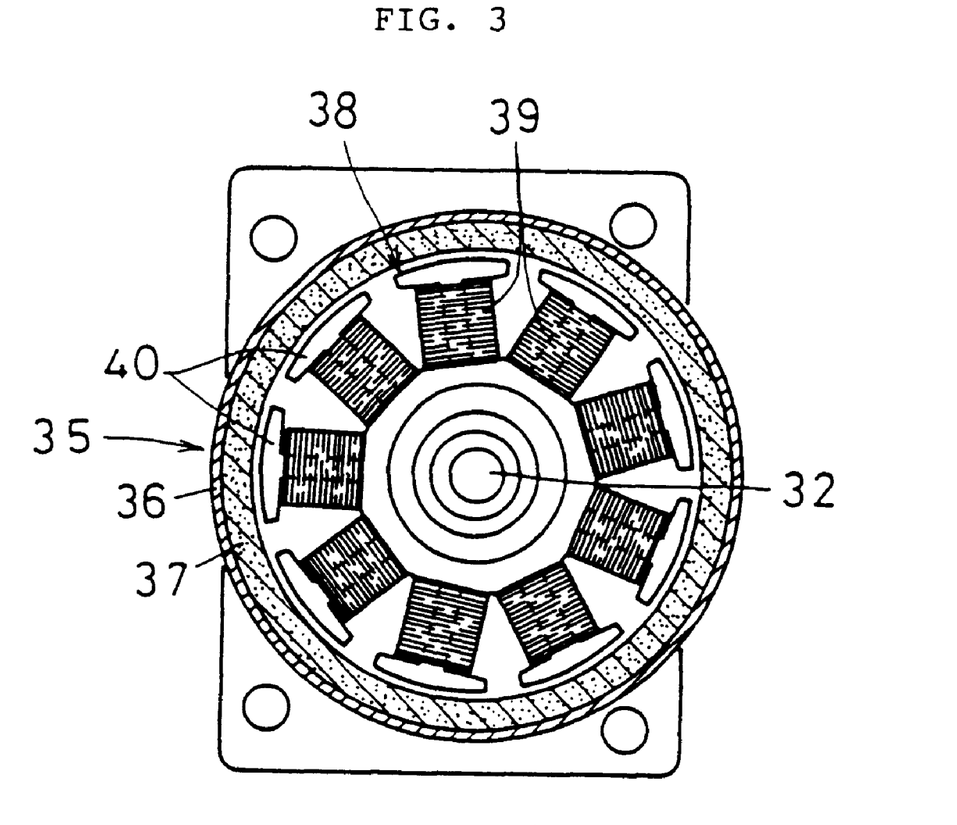
FIG. 3 is a schematic cross-sectional view showing an example of a three-phase AC generator employed in the embodiment of generating apparatus according to the present invention.

FIGS. 1 and 2 show an embodiment of generating apparatus according to the present invention and FIG. 3 shows the structure of a three-phase AC generator employed in the embodiment shown in FIGS. 1 and 2.

In the embodiment shown in FIGS. 1 and 2, a three-phase AC generator 11 and a manual rotary driving mechanism which includes a manual rotary driver 12 and an accelerator 13 and engages with the three-phase AC generator 11 are provided.

The manual rotary driver 12 comprises a rotary shaft 15 and a rotary driving handle 16 mounted on the end of the rotary shaft 15. The rotary driving handle 16 comprises a disc-shaped member 16a fastened on the end of the rotary shaft 15 by a screw, an arm member 16c with its one end connected through an axis 16b with the disc-shaped member 16a to be rotatable to the disc-shaped member 16a, and a knob 16d mounted to be rotatable on the other end of the arm member 16c. The knob 16d, arm member 16c and disc-shaped member 16a can be manually rotated with a rotation axis along the rotary shaft 15 when the rotary driving handle 16 is put in such a condition as shown in FIGS. 1 and 2.

A gear 17 is mounted on the rotary shaft 15 to engage with a gear 18. The gear 18 is coaxially incorporated with a gear 19 which engages with a gear 21 mounted on a rotary shaft 20. A gear 31 is also mounted on the rotary shaft 20 to rotate together with the gear 19. The gear 31 engages with a gear 33 mounted on a rotary shaft 32 of the three-phase AC generator 11.

The rotary shafts 15 and 20 and a rotary shaft common to the gears 18 and 19 are supported by bearings provided on fixed supporting members 22 and 23. The gears 17, 18, 19, 21 and 31 in the aggregate constitute the accelerator 13 which is operative to increase the rotation of the rotary shaft 15 and transmit the increased rotation to the gear 33 mounted on the rotary shaft 32 of the three-phase AC generator 11.

In the three-phase AC generator 11 having the rotary shaft 32 on which the gear 33 is mounted, the rotary shaft 32 is supported by a bearing 34 secured on the fixed supporting member 23. Then, a rotor 35 of the three-phase AC generator 11 is mounted on the rotary shaft 32. The rotor 35 comprises a cup-shaped rotary supporting member 36 and a ring magnet 37 attached to the inner surface of a cylindrical portion of the cup-shaped rotary supporting member 36. The cylindrical portion of the cup-shaped rotary supporting member 36 and the ring magnet 37 attached to the inner surface of the cylindrical portion constitute an annular portion of the rotor 35.

A stator 38 of the three-phase AC generator 11, which is fixed on the bearing 34 and the fixed supporting member 23, is arranged around the rotary shaft 32 at the inside of the ring magnet 37 of the rotor 35. The stator 38 has a plurality of stator coils 39 arranged at regular intervals in a circle with the rotary shaft 32 at the center, as shown in FIG. 3. Magnetic pole portions of magnetic cores 40 on which the stator coils 39 are wound, respectively, form an outer peripheral portion of the stator 38 and each of the magnetic pole portions of magnetic cores 40 is positioned to face the inner surface of the ring magnet 37 of the rotor 35 with a small magnetic gap therebetween. Accordingly, the annular portion of the rotor 35, which is constituted by the cylindrical portion of the cup-shaped rotary supporting member 36 and the ring magnet 37 attached to the inner surface of the cylindrical portion, surrounds the outer peripheral portion of the stator 38 to be opposite to the stator 38. The stator coils 39 are connected with one another to form, for example, a star connection.

In the embodiment constituted as mentioned above, as shown in FIGS. 1 and 2, a diameter Dg of the gear 33 mounted on the rotary shaft 32 of the three-phase AC generator 11 is set to be larger than a diameter Da of the rotary shaft 32 and smaller than a diameter Dr of the annular portion of the rotor 35, which is constituted by the cylindrical portion of the cup-shaped rotary supporting member 36 and the ring magnet 37 attached to the inner surface of the cylindrical portion.

When the knob 16d provided on the arm member 16c of the rotary driving handle 16, which is in such a condition as shown FIGS. 1 and 2, is pinched and moved to rotate the arm member 16c and disc-shaped member 16a with the rotary shaft 15 at the center by, for example, a user of the embodiment, the rotary shaft 15 is rotated. The rotation of the rotary shaft 15 resulting from the rotation of the rotary driving handle 16 is transmitted through the gears 17, 18, 19, 21 and 31 constituting the accelerator 13 to the gear 33 mounted on the rotary shaft 32 of the three-phase AC generator 11. On this occasion, the gears 17, 18, 19, 21 and 31 are operative to increase the rotation of the rotary shaft 15 at a predetermined rotation increasing factor and to transmit the increased rotation to the gear 33. Further, a predetermined gear efficiency is set on a group of gears 17, 18, 19, 21 and 31.

This means that the gears 17, 18, 19, 21 and 31 constituting the accelerator 13 and the gear 33 mounted on the rotary shaft 32 are operative to increase the rotation of the rotary shaft 15 at the predetermined rotation increasing factor and to transmit the increased rotation to the rotor 35 of the three-phase AC generator 11 for driving the annular portion of the rotor 35, which is constituted by the cylindrical portion of the cup-shaped rotary supporting member 36 and the ring magnet 37 attached to the inner surface of the cylindrical portion, to rotate because the rotor 35 is secured to the rotary shaft 32 of the three-phase AC generator 11.

When the annular portion of the rotor 35 is driven to rotate, the ring magnet 37 constituting the annular portion of the rotor 35 rotates relatively to the magnetic pole portions of the magnetic cores 40 each positioned to face the inner surface of the ring magnet 37 with the small magnetic gap therebetween. With such movement of the ring magnet 37, electromotive force is generated in each of the stator coils 39 wound on the magnetic cores 40, respectively, and the three-phase AC generator 11 is put in operation for generating electric power including three-phase voltages and currents. This operation for generating electric power of the three-phase AC generator 11 continues during the rotation of the rotary driving handle 16 constituting the manual rotary driver 12.

Figure 4:
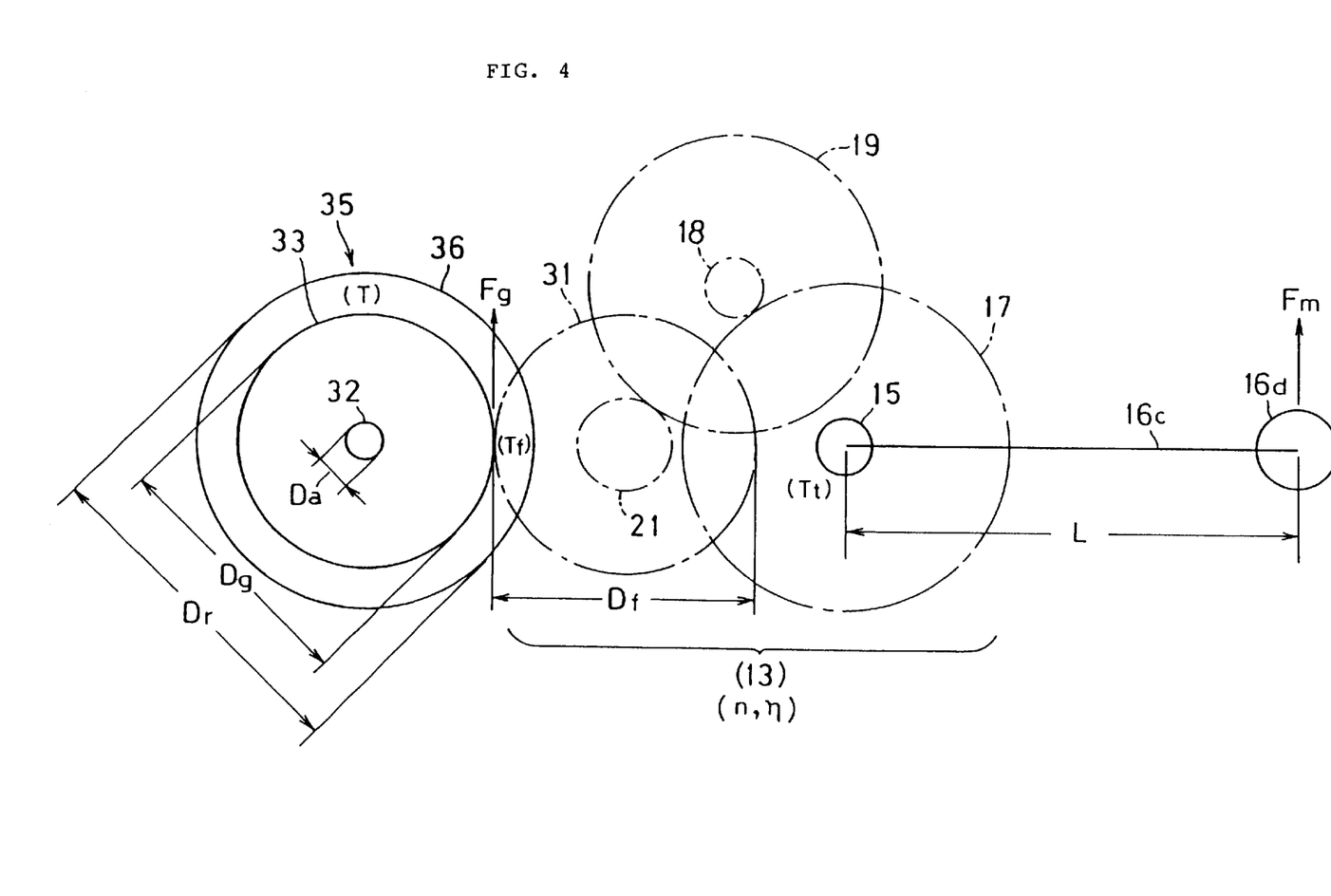
FIG. 4 is an illustration used for explaining the operation of the embodiment of generating apparatus according to the present invention.

Assuming that, as shown in FIG. 4, L represents the length of the arm member 16c of the rotary driving handle 16, in other words, the distance from the center of the rotary shaft 15 to the center of the knob 16d, n represents the rotation increasing factor set for the group of gears 17, 18, 19, 21 and 31 constituting the accelerator 13, η represents the gear efficiency set on the group of gears 17, 18, 19, 21 and 31, Df represent the diameter of the gear 31, T represents the torque necessary for rotating the rotor 35 of the three-phase AC generator 11, Fg represents the force required to act on the gear 33 for producing the torque T, Tf represents the torque required to be transmitted to the gear for producing the force Fg, Tt represents the torque necessary for rotating the rotary shaft 15, and Fm represents the force required to act on the knob 16d for producing the torque Tt, in other words, for rotating the rotor 35 of the three-phase AC generator 11, the following equations are satisfied.

$$Fg = 2 \cdot T/Dg \qquad (1)$$

$$Tf = Fg \cdot Df/2$$

$$Tt = n \cdot \eta \cdot Tf = n \cdot \eta \cdot Fg \cdot Df/2$$

$$Fm = Tt/L = n \cdot \eta \cdot Fg \cdot Df/(2 \cdot L) \qquad (2)$$

As aforementioned, in the three-phase AC generator 11, the diameter Dg of the gear 33 mounted on the rotary shaft 32 of the three-phase AC generator 11 is set to be larger than the diameter Da of the rotary shaft 32 and smaller than the diameter Dr of the annular portion of the rotor 35, which is constituted by the cylindrical portion of the cup-shaped rotary supporting member 36 and the ring magnet 37 attached to the inner surface of the cylindrical portion. It is understood from the above mentioned equation (1) that the larger the diameter Dg of the gear 33 is, the smaller the force Fg required to act on the gear 33 for rotating the rotor 35 of the three-phase AC generator 11 is. Accordingly, since the diameter Dg of the gear 33 is set to be larger than the diameter Da of the rotary shaft 32, the force Fg which is required to act on the gear 33 for rotating the rotor 35 of the three-phase AC generator 11 is smaller than that in the case where the diameter Dg of the gear 33 is set to be equal to or smaller than the diameter Da of the rotary shaft 32 and reduced to be relatively small in response to increases in the diameter Dg of the gear 33 within the range smaller than the diameter Dr of the annular portion of the rotor 35. This results in that the torque Tf which is required to be transmitted to the gear 33 for producing the force Fg is reduced.

Further, since the diameter Dg of the gear 33 is set to be smaller than the diameter Dr of the annular portion of the rotor 35, the peripheral speed of the annular portion of the rotor 35 is more accelerated compared with the peripheral speed of the gear 33. Accordingly, the rotation increasing factor n which is set for the accelerator 13 for obtaining a desired peripheral speed of the annular portion of the rotor 35 is smaller than that in the case where the diameter Dg of the gear 33 is set to be equal to or larger than the diameter Dr of the annular portion of the rotor 35 and reduced to be relatively small in response to decreases in the diameter Dg of the gear 33 within the range larger than the diameter Da of the diameter Da of the rotary shaft 32.

It is also understood from the above mentioned equation (2) that the larger the diameter Dg of the gear 33 is, the smaller the force Fg is or the smaller the rotation increasing factor n is, the smaller the force Fm which is required to act on the knob 16d for rotating the rotor 35 of the three-phase AC generator 11 is. Accordingly, under the situation where the force Fg comes to be relatively small and the rotation increasing factor n comes to be also relatively small, the force Fm which is required to act on the knob 16d for rotating the rotor 35 of the three-phase AC generator 11 is effectively reduced to be relatively small. This results in that the rotary driving handle 16 which constitutes the manual rotary driver 12 can be appropriately rotated by relatively small force.

Figure 5:
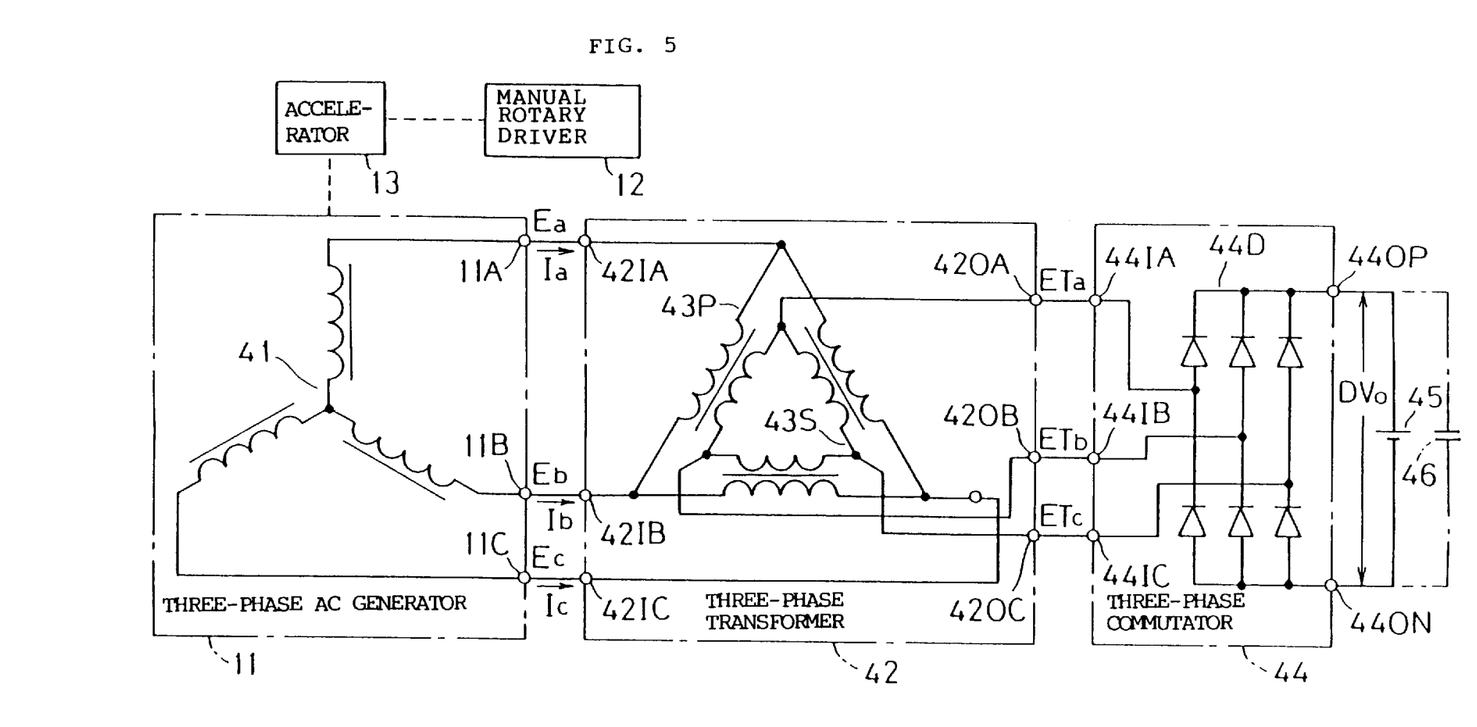
FIG. 5 is a circuit diagram including block indications and showing an example of an electric power supplying apparatus to which the embodiment of generating apparatus according to the present invention is applied.

FIG. 5 shows an example of an electric power supplying apparatus to which the embodiment of generating apparatus according to the present invention is applied.

In the example of the electric power supplying apparatus shown in FIG. 5, a plurality of stator coils of the three-phase AC generator 11 are connected with one another to form a star connection 41. Three-phase voltages Ea, Eb and Ec, which are output voltages obtained based on the electric power generated by the three-phase AC generator 11, are induced respectively to output terminals 11A, 11B and 11C to which the star connection 41 is connected. These three-phase voltages Ea, Eb and Ec obtained at the output terminals 11A, 11B and 11C of the three-phase AC generator 11 are supplied to input terminals 42IA, 42IB and 42IC of a three-phase transformer 42.

The three-phase transformer 42 comprises primary coils connected with each other to form a delta connection 43P and secondary coils connected with each other to form a delta connection 43S. The delta connection 43P formed by the primary coils is connected to the input terminals 42IA, 42IB and 42IC and the delta connection 43S formed by the secondary coils is connected to output terminals 420A, 420B and 420C. The ratio of the secondary coil to the primary coil is selected to be N to 1 (N>1) and therefore an alternating-voltage being 1/N lower than an alternating-voltage at the primary coil is induced to, the secondary coil. Accordingly, three-phase voltages ETa, ETb and ETc which are obtained by reducing the three-phase voltages Ea, Eb and Ec supplied to the input terminals 42IA, 421B and 42IC of the three-phase transformer 42 are induced to the output terminals 420A, 420B and 420C of the three-phase transformer 42, respectively.

The three-phase voltages ETa, ETb and ETc obtained at the output terminals 420A, 420B and 420C of the three-phase transformer 42, respectively, are supplied to input terminals 44IA, 44IB and 44IC of a three-phase commutator 44, respectively. In the three-phase commutator 44, each of the three-phase voltages ETa, ETb and ETc from the three-phase transformer 42 is commutated by a group of diodes 44D to produce a direct-current (DC) voltage DVo between a positive output terminal 440P and a negative output terminal 440N.

Positive and negative terminals of a secondary battery 45 or positive and negative terminals of a condenser 46 for accumulating electric power as shown with dot and dash lines in FIG. 5 are connected to the positive and negative output terminals 440P and 440N of the three-phase commutator 44, respectively. The direct-current voltage DVo obtained between the positive and negative output terminals 440P and 440N of the three-phase commutator 44 and a direct-current caused by the direct-current voltage DVo are supplied to the secondary battery 45 or the condenser 46 for accumulating electric power and subjected to charge therein.

The three-phase transformer 42 and the three-phase commutator 44 constitute a voltage to current convertor relative to the three-phase voltages Ea, Eb and Ec which are the output voltages induced respectively at the output terminals 11A, 11B and 11C of the three-phase AC generator 11 based on the electric power generated by the three-phase AC generator 11 and three-phase currents Ia, Ib and Ic which are output currents caused respectively by the three-phase voltages Ea, Eb and Ec to flow through the output terminals 11A, 11B and 11C of the three-phase AC generator 11. The secondary battery 45 or the condenser 46 for accumulating electric power constitutes a load of the three-phase AC generator 11. Accordingly, the voltage to current convertor comprising the three-phase transformer 42 and the three-phase commutator 44 is connected between the output terminals 11A, 11B and 11C of the three-phase AC generator 11 and the load constituted by the secondary battery 45 or the condenser 46 for accumulating electric power.

With the three-phase transformer 42, the value of each of the three-phase voltages Ea, Eb and Ec induced as the output voltages to the output terminals 11A, 11B and 11C of the three-phase AC generator 11 has N-fold increase and the value of each of the three-phase currents Ia, Ib and Ic flowing as the output currents through the output terminals 11A, 11B and 11C of the three-phase AC generator 11 has 1/N-fold reduction, compared with a case where the input terminals 44IA, 44IB and 44IC of the three-phase commutator 44 are directly coupled with the output terminals 11A, 11B and 11C of the three-phase AC generator 11, respectively, so that the three-phase voltages each having the value Vet are supplied to the input terminals 44IA, 44IB and 44IC of the three-phase commutator 44, respectively, and the three-phase currents each having the value Ait flow through the input terminals 44IA, 44IB and 44IC of the three-phase commutator 44, respectively.

Consequently, the voltage to current convertor which comprises the three-phase transformer 42 and the three-phase commutator 44 and is connected between the output terminals 11A, 11B and 11C of the three-phase AC generator 11 and the load constituted by the secondary battery 45 or the condenser 46 for accumulating electric power, is operative to supply the load constituted by the secondary battery 45 or the condenser 46 for accumulating electric power with the electric power obtained from the three-phase AC generator 11 in such a manner that each of the three-phase voltages Ea, Eb and Ec induced as the output voltages to the output terminals 11A, 11B and 11C of the three-phase AC generator 11 is arranged to be relatively high and each of the three-phase currents Ia, Ib and Ic flowing as the output currents through the output terminals 11A, 11B and 11C of the three-phase AC generator 11 is arranged to be relatively small.

As aforementioned, in the three-phase AC generator 11, the smaller each of the three-phase currents Ia, Ib and Ic flowing as the output currents through the output terminals 11A, 11B and 11C of the three-phase AC generator 11 is, the smaller the torque necessary for rotating the rotor of the three-phase AC generator 11 is. Accordingly, in the example shown in FIG. 1, since each of the three-phase currents Ia, Ib and Ic flowing as the output currents through the output terminals 11A, 11B and 11C of the three-phase AC generator 11 is arranged to be relatively small, such as to have 1/N reduction compared with the case where the three-phase transformer 42 is not employed, the torque necessary for rotating the rotor 35 of the three-phase AC generator 11 is effectively reduced.

Applicability For Industrial Use

As apparent from the above description, in the generating apparatus according to the present invention, when the rotary driver of the manual rotary driver mechanism is rotated, under a situation wherein the rotation of the rotary driver in the manual rotary driving mechanism is increased by the accelerator in the manual rotary driving mechanism and the increased rotation is transmitted to the gear mounted on the rotary shaft of the AC generator, and thereby, the rotor secured on the rotary shaft of the AC generator is driven to rotate, the diameter of the gear mounted on the rotary shaft of the AC generator is set to be larger than the diameter of the rotary shaft and smaller than the diameter of the annular portion of the rotor of the AC generator. With the diameter of the gear mounted on the rotary shaft of the AC generator, which is set to be larger than the diameter of the rotary shaft, the force required to act necessarily on the gear mounted of the rotary shaft of the AC generator for causing the rotor mounted of the rotary shaft of the AC generator to rotate can be reduced and thereby the torque required to be transmitted to the gear mounted of the rotary shaft of the AC generator can be reduced. Further, with the diameter of the gear mounted on the rotary shaft of the AC generator, which is set to be smaller than the diameter of the annular portion of the rotor of the AC generator, the peripheral speed of the annular portion of the rotor of the AC generator is more accelerated compared with the peripheral speed of the gear mounted on the rotary shaft of the AC generator and thereby the rotation increasing factor necessitated in the accelerator of the manual rotary driver mechanism for obtaining the predetermined peripheral speed of the annular portion of the rotor of the AC generator can be reduced.

Consequently, with the reduction in the force required to act necessarily on the gear mounted of the rotary shaft of the AC generator so as to cause the rotor mounted of the rotary shaft of the AC generator to rotate, which results from such an arrangement that the diameter of the gear mounted on the rotary shaft of the AC generator is set to be larger than the diameter of the rotary shaft, and the reduction in the rotation increasing factor necessitated in the accelerator of the manual rotary driver mechanism for obtaining the predetermined peripheral speed of the annular portion of the rotor of the AC generator, which results from such an arrangement that the diameter of the gear mounted on the rotary shaft of the AC generator is set to be smaller than the diameter of the annular portion of the rotor of the AC generator, the force required to act necessarily on the rotary driver of the manual rotary driver mechanism for rotating the same can be effectively reduced and therefore the rotary driver can be easily and appropriately rotated by the relatively small force.

What is claimed is:

1. A generating apparatus comprising:

an AC generator having a stator arranged around a rotary shaft and a rotor secured to the rotary shaft and provided with an annular portion surrounding an outer peripheral portion of the stator;

a manual rotary driver mechanism including an accelerator engaging with a gear mounted on the rotary shaft of the generator; and a rotary driver engaging with the accelerator and operative to drive the rotor of the AC generator to rotate through the accelerator and the gear mounted on the rotary shaft of the AC generator so as to cause the AC generator to generate electric power when the rotary driver is rotated, wherein the diameter of the gear mounted on the rotary shaft of the AC generator is selected to be substantially larger than a diameter of the rotary shaft, thereby decreasing a force required to rotate the gear mounted on the rotary shaft, the diameter of the gear mounted on the rotary shaft of the AC generator is selected to be substantially the same as a diameter of the stator and only slightly smaller than an outer diameter of the annular portion of the rotor, thereby accelerating a peripheral speed of the annular portion of the rotor more than a peripheral speed of the gear mounted on the rotary shaft of the AC generator, and wherein the accelerator includes a plurality of gears mounted on a plurality of rotary gear shafts, wherein the plurality of rotary gear shafts are aligned so as not to be mutually perpendicular and not to be perpendicular to the rotary shaft of the generator, so that the plurality of rotary shafts are mutually aligned in parallel and are parallel to the rotary shaft of the generator, thereby to reduce an overall size of the generating apparatus.

2. The generating apparatus according to the claim 1, wherein the stator of the AC generator includes a plurality of coils wound on a respective plurality of magnetic cores and arranged in a circle and the annular portion of the rotor of the AC generator includes a ring magnet surrounding the plurality of magnetic cores and positioned to face the plurality of magnetic cores.

3. The generating apparatus according to claim 1 or 2, wherein the rotary driver in the manual rotary driver mechanism comprises a handle for rotating a driving shaft, and the accelerator in the manual rotary driver mechanism comprises a plurality of gears including a gear mounted on the driving shaft to provide increased rotation of the driving shaft, so that the increased rotation is transmitted to the gear mounted on the driving shaft.

4. The generating apparatus according to claim 1 or 2, wherein the AC generator comprises a three-phase AC generator.

* * * * *